United States Patent
Maguin

(10) Patent No.: US 10,161,279 B2
(45) Date of Patent: Dec. 25, 2018

(54) TANK DEVICE FOR AN AQUEOUS UREA SOLUTION AND METHOD FOR REDUCING ICE PRESSURE IN A TANK DEVICE

(71) Applicant: CONTINENTAL AUTOMOTIVE GMBH, Hannover (DE)

(72) Inventor: Georges Maguin, Marly (FR)

(73) Assignee: Continental Automotive GmbH, Hannover (DE)

( * ) Notice: Subject to any disclaimer, the term of this patent is extended or adjusted under 35 U.S.C. 154(b) by 44 days.

(21) Appl. No.: 15/622,860

(22) Filed: Jun. 14, 2017

(65) Prior Publication Data

US 2017/0328255 A1 Nov. 16, 2017

Related U.S. Application Data

(63) Continuation of application No. PCT/EP2015/079576, filed on Dec. 14, 2015.

(51) Int. Cl.
*F01N 3/00* (2006.01)
*F01N 3/20* (2006.01)
*F01N 3/28* (2006.01)

(52) U.S. Cl.
CPC ......... *F01N 3/2066* (2013.01); *F01N 3/2896* (2013.01); *F01N 2610/02* (2013.01); *F01N 2610/1406* (2013.01); *F01N 2610/1486* (2013.01); *Y02A 50/2325* (2018.01); *Y02T 10/24* (2013.01)

(58) Field of Classification Search
USPC .......... 60/274, 282, 286, 295, 297, 301, 303
See application file for complete search history.

(56) References Cited

U.S. PATENT DOCUMENTS

| 9,169,759 | B2* | 10/2015 | Zanek ................... F01N 3/2066 |
| 9,976,463 | B2* | 5/2018 | Dementhon ............ C01C 1/006 |
| 2009/0282813 | A1* | 11/2009 | Kopinsky ............. F01N 3/2066 60/286 |
| 2015/0176460 | A1* | 6/2015 | Dementhon .......... F01N 3/2066 137/14 |

(Continued)

FOREIGN PATENT DOCUMENTS

| DE | 102008054623 A1 | 6/2010 |
| DE | 102008054645 A1 | 6/2010 |
| DE | 102008054803 A1 | 6/2010 |

(Continued)

OTHER PUBLICATIONS

International Search Report and Written Opinion dated Dec. 14, 2015 from corresponding International Patent Application No. PCT/EP2015/079576.

(Continued)

*Primary Examiner* — Binh Q Tran

(57) ABSTRACT

A tank device for an aqueous urea solution for injection into an exhaust system of a motor vehicle. The tank device includes a tank with a tank housing, an interior space located therein, a base and a cover. A separate base portion is attached to the tank housing and partially bounds the interior space. A lamella structure is formed on an upper side of the separate base portion, and the lamella structure has at least one lamella which at least partially subdivides the interior space of the tank above the base portion into a plurality of cells.

10 Claims, 4 Drawing Sheets

(56) References Cited

U.S. PATENT DOCUMENTS

2016/0206996 A1* 7/2016 Van Schaftingen ... B01D 53/90
2016/0290203 A1* 10/2016 Dougnier ............. F01N 3/2066

FOREIGN PATENT DOCUMENTS

| DE | 102009002209 A1 | 10/2010 |
|----|-----------------|---------|
| DE | 102009027952 A1 | 1/2011 |
| DE | 102009046954 A1 | 5/2011 |
| DE | 102009046956 A1 | 5/2011 |
| DE | 102009046965    | 5/2011 |
| DE | 102009047101 A1 | 5/2011 |
| DE | 102012110760 A1 | 5/2014 |

OTHER PUBLICATIONS

German Search Report dated Aug. 20, 2015 for corresponding patent application No. 10 2014 118 760.1.

\* cited by examiner

TANK DEVICE FOR AN AQUEOUS UREA SOLUTION AND METHOD FOR REDUCING ICE PRESSURE IN A TANK DEVICE

CROSS-REFERENCE TO RELATED APPLICATIONS

This application claims the benefit of PCT Application PCT/EP2015/079576, filed Dec. 14, 2015, which claims priority to German Application DE 10 2014 118 760.1, filed Dec. 16, 2014. The disclosures of the above applications are incorporated herein by reference.

FIELD OF THE INVENTION

The present invention relates to a tank device for an aqueous urea solution, in particular for injection into an exhaust tract of a motor vehicle, and to a method for reducing a pressure in a corresponding tank device. Tank devices of this type are used in particular in diesel vehicles in which nitrogen oxide emissions are reduced with the aid of an SCR (selective catalytic reduction) method.

BACKGROUND OF THE INVENTION

The ammonia required for the SCR reaction is made available in a tank of the tank device in the form of, in particular, a 32.5% aqueous urea solution, which is also marketed as AdBlue®. The aqueous urea solution is metered into an SCR catalytic converter in the exhaust tract, for example is injected by means of a dosing pump and/or an injector. The components required for the delivery of urea solution are preferably arranged at least partially in an interior and/or on a base of the tank. A disadvantage of the known tank devices is that, during the freezing of the aqueous urea solution owing to very low outside temperatures, a very high pressure may be exerted on the dosing pump, causing mechanical damage to the dosing pump, as a result of an expansion of the aqueous urea solution as it freezes.

SUMMARY OF THE INVENTION

It is therefore an object of the invention to at least partially solve the problems highlighted with regard to the prior art and in particular to specify a tank device for an aqueous urea solution, by means of which tank device it is possible for damage to the tank or of delivery modules positioned therein to be prevented even in the event of freezing of the aqueous urea solution. Furthermore, it is also sought to specify a method for reducing a pressure in a tank device for an aqueous urea solution, by means of which method it is possible for damage to the tank and/or of delivery modules positioned therein in the event of freezing of the aqueous urea solution to be prevented.

The aforementioned objects are achieved by means of a tank device and a method according to the features of the independent patent claims. Further advantageous refinements of the invention are specified in the dependent patent claims. It should be pointed out that the features specified individually in the dependent patent claims may be combined with one another in any desired technologically meaningful way and define further embodiments of the invention. Furthermore, the features specified in the patent claims are rendered more precisely and explained in more detail in the description, with further preferred refinements of the invention being presented.

For this purpose, a tank device for an aqueous urea solution is proposed, which tank device has at least the following components:
a tank with a tank housing, with an interior situated therein, with a base and with a top wall;
a separate base section, which is attached to the tank housing and partially delimits the interior; and
a lamellar structure which is formed on a top side of the separate base section, wherein the lamellar structure has at least one lamella which divides the interior of the tank above the separate base section at least partially into a multiplicity of cells.

The tank device proposed here serves in particular for making available an aqueous urea solution in a motor vehicle.

For this purpose, the tank device has a tank with a tank housing and with an interior which is defined by the tank housing and in which the aqueous urea solution is stored and/or transported. The interior is furthermore preferably closed, wherein, in accordance with the desired installation position, a (lower) base and an opposite (upper) top wall may be identified.

For the injection of the aqueous urea solution into an exhaust tract of the motor vehicle, the tank device has, for example, an in particular electric pump which is arranged at least partially in the interior of the tank. For this purpose, the tank may have, in particular in a base, an opening through which the pump projects into the interior and in which the pump is fastened. Furthermore, electrical heaters, sensors, valves etc. may also be positioned at least partially in the interior of the tank housing. Precisely such components are, by way of a protective layer and/or a chamber, arranged in the interior so as to be protected against the aqueous urea solution. The protective layer and/or the chamber may in this respect also form a separate base section of the tank, because the base section is provided separately from the tank housing and is subsequently joined to the tank housing. In any case, the joint between the tank housing and the separate base section is particularly critical with regard to ice expansion forces that occur in the interior of the tank. The expression "base section" encompasses a tank wall section that is normally wetted or covered by the aqueous urea solution and is thus generally situated in the lower half of the tank or directly in the base of the tank. The base section or the chamber, formed by the base section, with components (pump, heaters, valves, etc.) arranged therein may also form a delivery unit that is inserted into an opening in the base of the tank.

Therefore, on a top side of the base section, there is formed a lamellar structure which has at least one lamella. The at least one lamella is in particular a thin-walled body, for example a plate, rib or pipe wall. The at least one lamella has a thickness of preferably 1 mm (millimeter) to 10 mm. Furthermore, the at least one lamella extends in particular vertically and/or orthogonally with respect to the top side of the base section. Furthermore, the at least one lamella has, proceeding from the top side of the base section, a vertical height of preferably 10 mm to 500 mm, particularly preferably 100 mm to 400 mm. It is very particularly preferable for the lamella to extend beyond the maximum fill level of the aqueous urea solution in the tank, such that the upper ends are reliably situated outside the urea solution and prevent the formation of a closed ice sheet over the cross section, or even over every cross section, of the interior parallel to the base. The at least one lamella of the lamellar structure divides the interior of the tank above the base section at least partially into a multiplicity of cells. A cell is to be understood in particular to mean a sub-space, at least partially delimited by the at least one lamella, of the interior. Furthermore, the individual cells are in particular connected in fluid-conducting fashion to one another and/or to the rest of the interior.

As the aqueous urea solution freezes in the interior of the tank and in the cells, at least one predetermined breaking point is formed in the frozen aqueous urea solution owing to the lamellar structure. Here, the predetermined breaking point runs in particular along the at least one lamella. Here, the surface of the at least one lamella may in particular be designed such that the frozen aqueous urea solution is particularly easily detach from the surface of the at least one lamella. This may be realized for example by corresponding surface treatment of the at least one lamella and/or by way of an anti-adhesion coating. As the aqueous urea solution freezes in the tank, it is generally the case that a cavity, or a space with liquid aqueous urea solution, forms above the base section, which cavity or space is covered by frozen aqueous urea solution. As the freezing of the aqueous urea solution in the cavity progresses, the pressure in the cavity rises until the frozen aqueous urea solution breaks at the at least one predetermined breaking point, whereby the pressure in the cavity, and thus the pressure on the base section in the interior, is released. The lamellar structure is preferably designed such that the forces arising in the tank as a result of ice expansion are reduced and, in particular, a displacement of blocks of frozen aqueous urea solution in the cells owing to a counter pressure originating from the base section during the freezing process is permitted or ensured.

It is likewise advantageous if the at least one lamella extends over an entire width of the top side of the base section. In the case of a circular base section, the width is in particular the diameter of the base section. The width may also be determined accordingly in the case of other shapes of the separate base section.

The cells formed by the at least one lamella preferably completely cover or take up a space in the tank above the base section. Blocks of frozen aqueous urea solution in the individual cells are displaceable relative to one another (along the lamellae), wherein the forces required for this are several times lower than the forces required to break up an ice sheet of frozen aqueous urea solution in the tank. The surface of the lamellae of the lamellar structure preferably exhibits low adhesion with respect to blocks of frozen aqueous urea solution in the tank, such that blocks of frozen aqueous urea solution do not adhere with particularly great intensity to the surface of the lamellae of the lamellar structure. In particular, no high forces are transmitted from the blocks of frozen aqueous urea solution to the lamellar structure without the blocks being displaced relative to the lamellar structure. It is particularly preferable for the surface of the lamellae of the lamellar structure to be smooth with a roughness [$R_a$] of less than 8 μm [micrometer].

It is furthermore advantageous for the at least one lamella to extend at least as far as a maximum fill level of the tank. The maximum fill level of the tank is in particular a maximum admissible fill level of aqueous urea solution in the interior during operation of the tank. It is ensured in this way that the at least one predetermined breaking point formed by the at least one lamella extends as far as a surface of the aqueous urea solution even when the tank is full.

It is furthermore advantageous for the at least one lamella to have at least one first passage. Through the at least one first passage, it is possible for the aqueous urea solution to flow in particular into the multiplicity of cells. It is very particularly preferably provided that an exchange of aqueous urea solution between (adjacent) cells is made possible, in particular up until shortly before the urea solution in the respective cells has completely frozen. Here, the at least one first passage is preferably arranged directly on the top side of the base section, and preferably has a first vertical height of 0.1 mm to 1 mm (millimeter).

The lamellar structure is preferably in the form of a honeycomb body.

It is furthermore advantageous for the lamellar structure to be surrounded by a tubular housing. The tubular housing imparts stability to the at least one lamella of the lamellar structure or ice breaker structure. A cross-sectional area of the tubular housing preferably corresponds to the area of the base section. The tubular housing thus follows an outer contour of the base section. If the base section forms a chamber, the tubular housing forms a continuation of the shape of the chamber (upward) as far as the top wall of the tank.

It is furthermore advantageous for the tubular housing to have at least one second passage. Through the at least one second passage, it is possible for the aqueous urea solution to flow in particular into the multiplicity of cells. Here, the at least one second passage is preferably arranged directly on the top side of the base section, and preferably has a second vertical height of 0.1 mm to 1 mm.

First passages of the at least one lamella and second passages of the tubular housing preferably form a duct system which connects all of the cells of the lamellar structure to one another and through which an exchange of aqueous urea solution is necessary during operation.

Normally, aqueous urea solution in the first passages and in the second passages freezes very late, or even last, and blocks of frozen aqueous urea solution in the cells of the lamellar structure have then already been displaced. It is however also possible for aqueous urea solution to freeze in the first passages and in the second passages and for a relative displacement of blocks of frozen aqueous urea solution in the individual cells to occur only thereafter. The passages then function as predetermined breaking points at which the compound structure of frozen aqueous urea solution is broken up as a result of shear forces. The passages are preferably so small that the forces required for the frozen aqueous urea solution in the passages to be broken through are low, and are in particular so low that the forces do not cause a relative displacement of the base section, and instead, separation of the compound structure into blocks of frozen aqueous urea solution takes place at the passages. The first passages and second passages preferably have in each case a cross-sectional area of between 1 mm$^2$ and 10 mm$^2$ [square millimeters] and in each case a length of between 1 mm and 5 mm [millimeters]. It has been found that sections of frozen aqueous urea solution in such passages break, thus rendering blocks of frozen aqueous urea solution in the individual cells of the lamellar structure displaceable, even under the action of relatively low forces.

It is particularly advantageous for the at least one lamella to taper in an upward direction.

Here, the tapering of the at least one lamella takes place with an angle of preferably 0.4° to 0.6° (degrees), particularly preferably 0.5°, relative to a perpendicular to the top side of the base section.

This reduces the friction of frozen aqueous urea solution against the blocks, and in particular assists an upward relative displacement of blocks of frozen aqueous urea solution in the cells of the lamellar structure.

It is furthermore advantageous for the lamellar structure to be composed at least partially of polyoxymethylene (POM), HD polyethylene (HDPE) or polypropylene (PP). The lamellar structure is very particularly preferably composed of only one of the above-mentioned materials.

According to a further aspect, a method for reducing a pressure in a tank device for an aqueous urea solution is also specified, which method has at least the following steps:

a) provision of a tank device as proposed here;

b) filling of the tank of the tank device with the aqueous urea solution such that at least one lamella of the lamellar structure is at least partially covered by the aqueous urea solution; and c) freezing of the aqueous urea solution such that a cavity with liquid aqueous urea solution is formed in the frozen aqueous urea solution, wherein the liquid aqueous urea solution in the cavity is covered by frozen aqueous urea solution, and wherein the at least one lamella at least partially extends through the frozen aqueous urea solution covering the liquid aqueous urea solution, such that the at least one lamella divides the frozen aqueous urea solution into multiple cells which are displaced relative to one another during the freezing process.

Method step a) corresponds in a conventional manner to the production of the described tank device or to the installation of the described tank device in a motor vehicle. Here, method step b) describes an initial filling of the tank with aqueous urea solution, or a refilling process. Method step b) also encompasses partial refilling when the tank has been partially emptied as a result of the operation of a connected dosing device. In method step b), the tank is normally filled only to such an extent that the at least one lamella is partially covered by liquid and protrudes, in sections, out of the liquid.

Method step c) firstly encompasses freezing processes in which all of the aqueous urea solution in the tank was previously in the liquid state (initial freezing processes). Method step c) furthermore encompasses freezing processes in which all of the aqueous urea solution in the tank was previously already frozen, has subsequently partially thawed and then begins to freeze again (re-freezing processes).

In the case of initial freezing processes, it is normally the case that a surface of the aqueous urea solution freezes first, such that an ice layer is formed there. During the freezing process, the ice layer grows downward into the still-liquid urea solution, and thus becomes ever thicker. An upper region of the ice layer then forms a static boundary for the ice layer. The downward growth of the ice layer during the freezing process generates, in conjunction with the volume expansion of the aqueous urea solution as it freezes, an intense pressure which presses on the base of the tank and in particular on the separate base section of the tank. Special heat-conducting structures may be provided on the tank and in the tank, by means of which heat-conducting structures freezing behavior is at least partially modified such that the growth of the ice layer does not imperatively take place downward from the surface of the aqueous urea solution, but partially also takes place upward.

It is accordingly possible for the pressure on the base of the tank device, and in particular on the base section, to be at least partially reduced.

In the case of so-called re-freezing processes, it is a problem in particular that the aqueous urea solution preferentially thaws initially in the direct vicinity of the base section and in the direct vicinity of a delivery unit arranged on the base section, because heaters are provided there which are used to enable the provision of aqueous urea solution. A cavity filled with aqueous urea solution normally forms in the frozen aqueous urea solution in the vicinity of the base section. Re-freezing of the aqueous urea solution in the cavity may likewise cause a very high pressure to be exerted on the base of the tank and in particular on the base section.

By means of the at least one lamella, the frozen aqueous urea solution is divided, in the direct vicinity, into a multiplicity of blocks which are situated in each case in the cells of the lamellar structure and which are displaceable relative to one another and which, during the further freezing of the aqueous urea solution, are displaced relative to one another in order to reduce the build-up of pressure. There are preferably only relatively narrow passages through the at least one lamella, which passages have liquid-permeable connections between the individual cells. When the aqueous urea solution in the tank freezes completely, the passages are also filled with frozen aqueous urea solution. The frozen aqueous urea solution in the passages forms so-called predetermined breaking points between the individual cells of frozen aqueous urea solution. As a result of negative pressure or positive pressure that arises as the frozen aqueous urea solution thaws or as the frozen aqueous urea solution freezes again, the segments break apart at the predetermined breaking points in order to permit a displacement of the individual segments relative to one another.

With regard to further details of the method, reference is also made to the description of the tank device. The design features and advantages explained in conjunction with the described method may likewise be transferred to the described tank device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention and the technical field will be explained in more detail below on the basis of the figures. It should be pointed out that the figures show particularly preferred embodiment variants of the invention, to which the invention is however not restricted. Here, identical components in the figures are denoted by the same reference signs. The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1A:
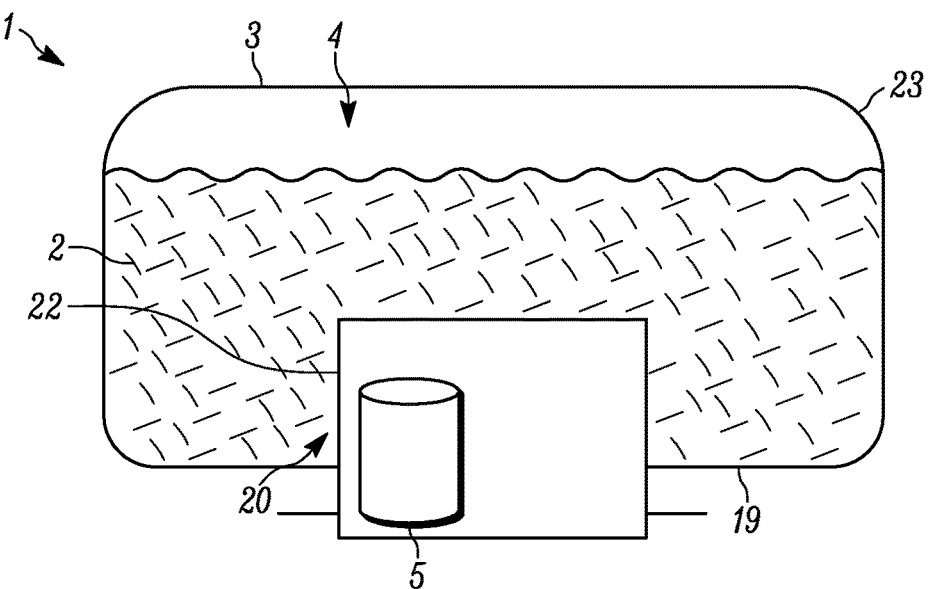
FIGS. 1A-1D depict a freezing process of an aqueous urea solution in the case of a tank device without lamellar structure.
Figure 1B:
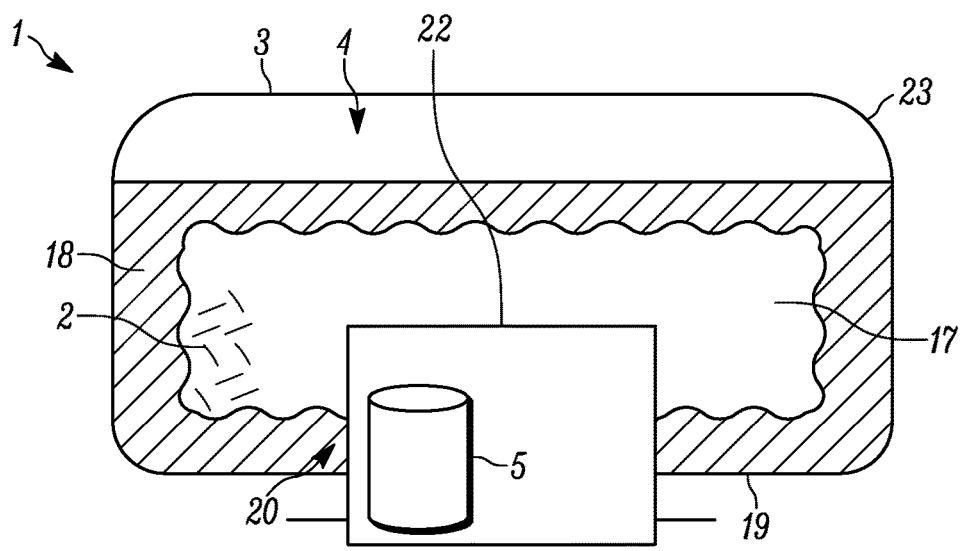
Figure 1C:
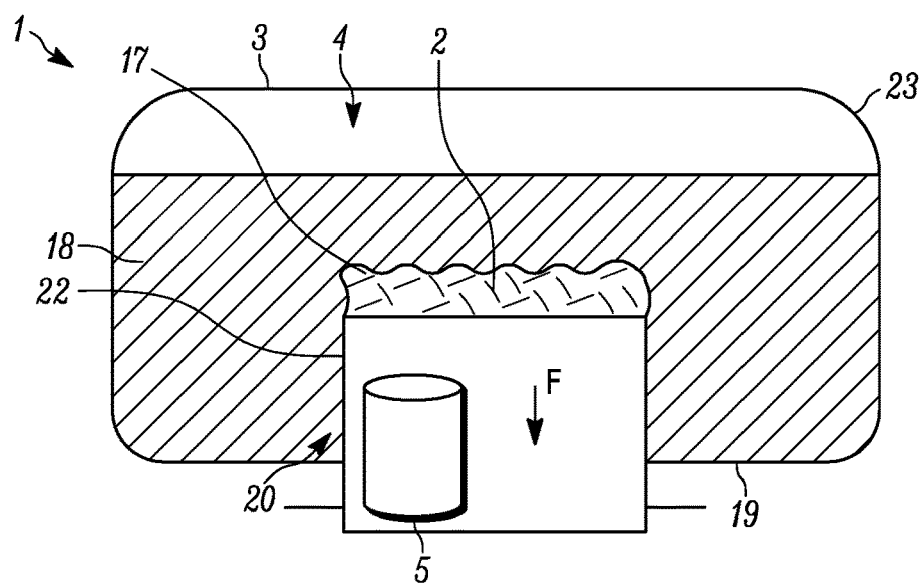
Figure 1D:
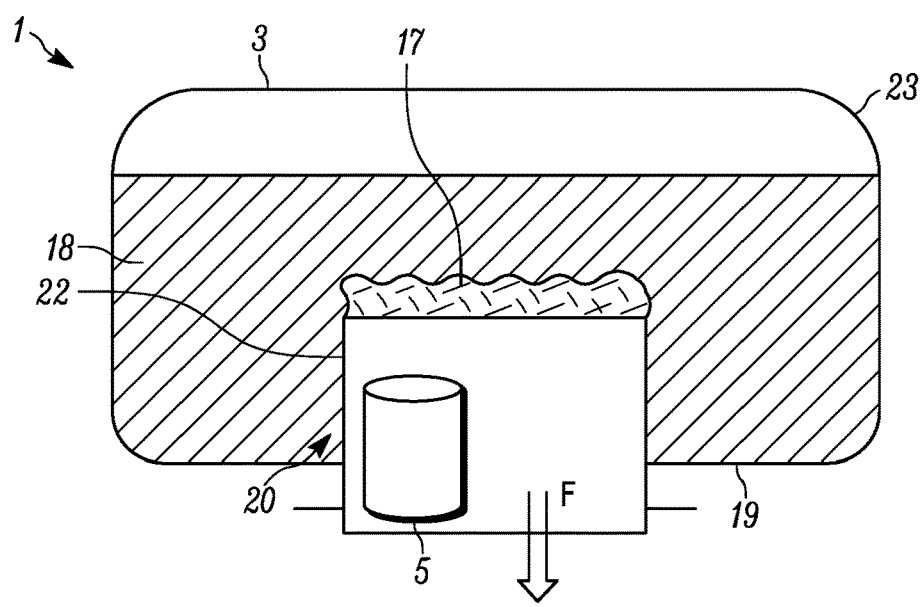

FIGS. 1A-1D show a freezing process of an aqueous urea solution 2 in a tank device 1 known from the prior art. The tank device 1 has, in FIGS. 1A-1D, a tank 3 with an interior 4. Furthermore, the tank 3 has a base 19 with an opening 20 through which a separate base section 22 extends, which base section is in this case formed, by way of example, with a chamber housing with a pump 5 situated therein, and extends into the interior 4 of the tank 3. In FIG. 1A, the aqueous urea solution 2 in the interior 4 of the tank 3 is liquid. In FIG. 1B, owing to low outside temperatures, the aqueous urea solution 2 has frozen, to form frozen aqueous urea solution 18, in an outer region of the interior 4. As a result, a cavity 17 with aqueous urea solution 2 still in liquid form has formed in the frozen aqueous urea solution 18. In FIG. 1C, the liquid aqueous urea solution 2 in the cavity 17 has frozen further, such that a pressure in the cavity 17 rises, the pressure acting on the base section 22. If the liquid aqueous urea solution 2 in the cavity 17 freezes further, as shown in FIG. 1D, the pressure in the cavity 17 rises to a level that could cause the base section to be damaged (for example deformed or even pushed out of the tank housing 23).

Figure 2:
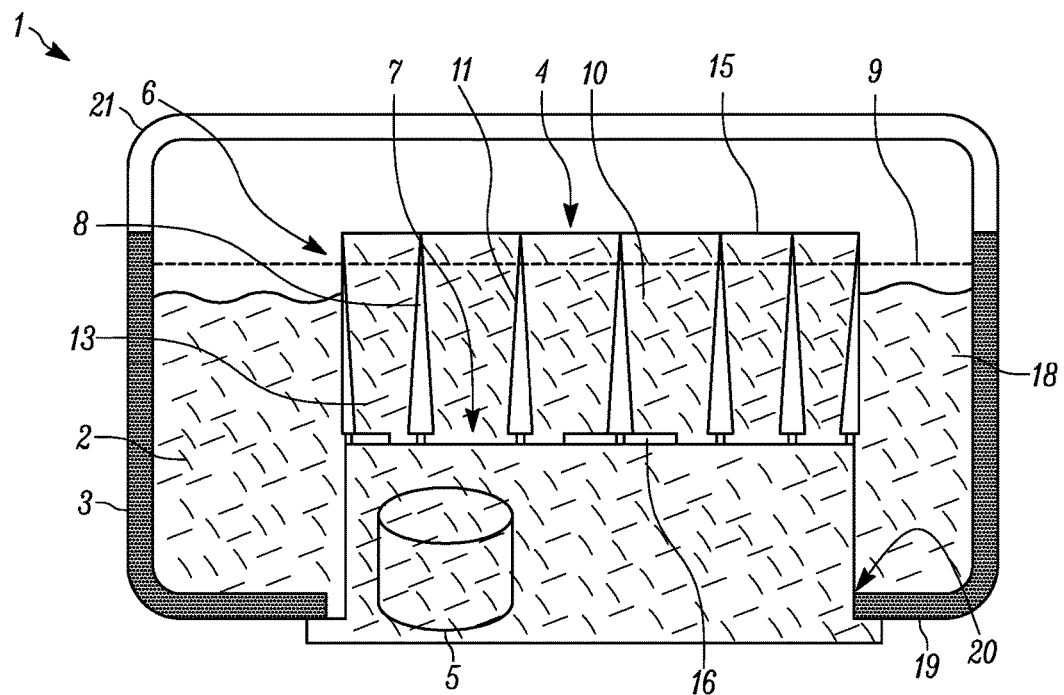
FIG. 2 is a sectional side view of a tank device having lamellar structure, according to embodiments of the present invention.

FIG. 2 shows a sectional illustration through a tank device 1 with a lamellar structure. The tank device 1 has a tank 3 with an interior 4. The interior 4 is filled with aqueous urea solution 2 up to a maximum fill level 9. The tank 3 has, in a base 19, an opening 20 through which a separate base section 22 extends, which base section is in this case again formed, by way of example, with a chamber housing with a pump 5 situated therein, and extends into the interior 4 of the tank 3. A lamellar structure 6 is fastened to a top side 7 of the base section 22 by means of spot-welded connections. The lamellar structure 6 has a multiplicity of vertical lamellae 8 which divide the interior 4 of the tank 3 above the base section 22 into a multiplicity of cells 10. The multiplicity of lamellae 8 each have, at the top side 7 of the base section 22, first passages 13 through which the aqueous urea solution 2 may flow between the individual cells 10. Furthermore, the multiplicity of lamellae 8 are surrounded by a tubular housing 15, as is also seen in FIG. 2. The tubular housing 15 has a second passage 16 through which aqueous urea solution 2 may flow into the multiplicity of cells 10. If the aqueous urea solution 2 freezes to form frozen aqueous urea solution 18, the frozen aqueous urea solution 18 breaks at predetermined breaking points 11 formed by the multiplicity of lamellae 8. To assist this process, the multiplicity of lamellae 8 taper in the direction of a top wall 21 of the tank 3. In this way, damage to the base section 22 or to components situated therebelow, such as a pump 5, is prevented.

Figure 3:
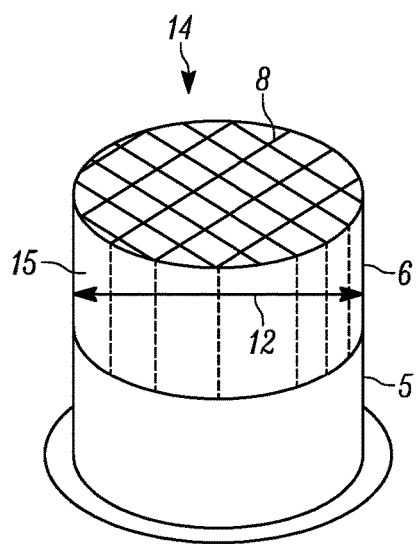
FIG. 3 is a perspective view of a base section having lamellar structure, according to embodiments of the present invention.

FIG. 3 shows a cylindrical, separate base section 22, which projects into the interior of the tank and has the lamellar structure 6, of the tank device 1 shown in FIG. 2. The lamellae 8 extend over an entire width 12 of the base section 22. Furthermore, the lamellar structure 6 is formed in the manner of a honeycomb body 14 which is surrounded by a tubular housing 15.

Figure 4:
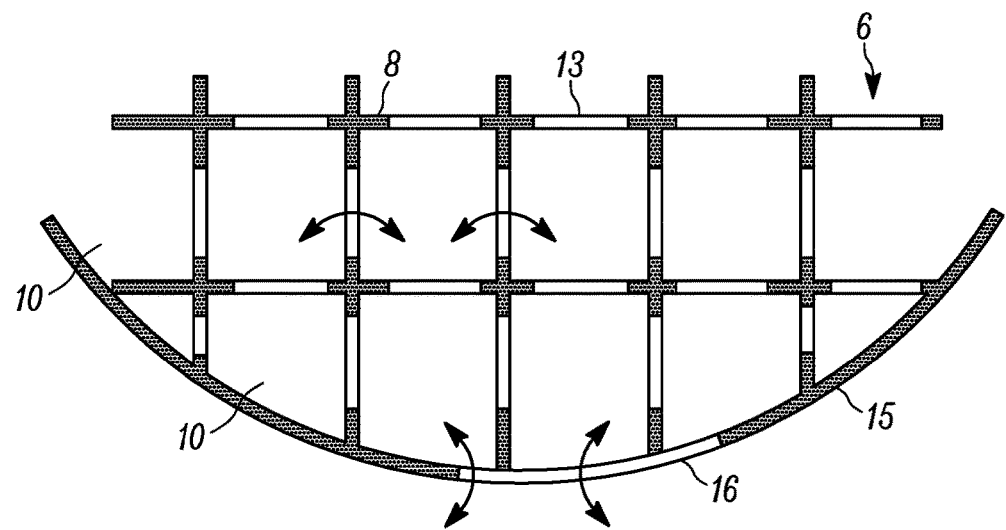
FIG. 4 is a partial cross-sectional view of lamellar structure, according to embodiments of the present invention.

FIG. 4 now shows in detail, and in cross section, an edge region of a lamellar structure 6 with a tubular housing 15. It is seen that, in this cross section, first openings 13 are positioned in or on the individual lamellae 8, and also, second openings 16 are positioned in the tubular housing 15. Both sets of passages preferably directly adjoin the base section, though may be adapted with regard to form, number and/or size. The second openings 16 permit an exchange of flow (indicated by arrows) through the tubular housing 15, such that the cells 10 formed with or by the lamellar structure 6 may be filled with the aqueous urea solution from the tank and vice versa. An exchange of aqueous urea solution within adjacent cells 10 is permitted and ensured by means of the first openings 13.

Figure 5:
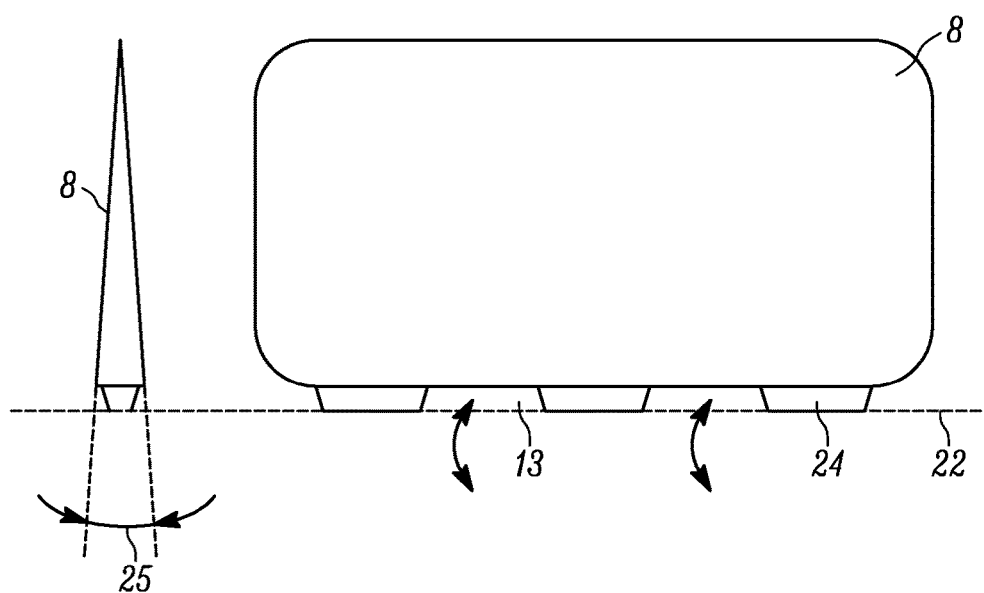
FIG. 5 is a side view of an alternate embodiment of a lamella, according to embodiments of the present invention.

Finally, FIG. 5 illustrates, in a front view (left) and in a side view (right) a preferred design variant of a lamella 8, which tapers upward, that is to say away from the base section 22, with a predefined angle 25. It is likewise seen that the lamella has multiple feet 24 between which the first openings 13 to the base section 22 are formed. The lamella 8 may also be non-detachably connected to the base section 22 by way of the feet 24.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A tank device for injecting an aqueous urea solution into an exhaust tract of a motor vehicle, comprising:
    a tank;
    a tank housing having an interior, the tank housing being part of the tank;
    a base, the base being part of the tank;
    a top wall integrally formed with the base, the top wall being part of the tank;
    a separate base section, which is attached to the tank housing and partially extends into the interior of the tank housing;
    a lamellar structure which is formed on a top side of the separate base section;
    at least one lamella being part of the lamellar structure; and
    a multiplicity of cells, the at least one lamella dividing the interior of the tank above the base section at least partially into the multiplicity of cells;
    wherein the aqueous urea solution flows through the multiplicity of cells.

2. The tank device of claim 1, wherein the at least one lamella extends over an entire width of the top side of the base section.

3. The tank device of claim 1, the tank further comprising a maximum fill level, wherein the at least one lamella extends at least as far as the maximum fill level of the tank.

4. The tank device of claim 1, the at least one lamella further comprising at least one first passage.

5. The tank device of claim 1, wherein the lamellar structure is formed as a honeycomb body.

6. The tank device of claim 1, further comprising a tubular housing, wherein the lamellar structure is surrounded by the tubular housing.

7. The tank device of claim 6, the tubular housing further comprising at least one second passage.

8. The tank device of claim 1, wherein the at least one lamella tapers in an upward direction.

9. The tank device of claim 1, wherein the lamellar structure is made from a material being one selected from the group consisting of polyoxymethylene, HD polyethylene, and polypropylene.

10. A method for reducing a pressure in a tank device for an aqueous urea solution for injection into an exhaust tract of a motor vehicle, having at least the following steps:
    providing a tank device;
    providing a tank being part of the tank device; and
    providing a lamella structure having at least one lamella located inside the tank;

filling the tank with an aqueous urea solution such that the at least one lamella is at least partially covered by the aqueous urea solution;

freezing at least a portion of the liquid aqueous urea solution such that the frozen portion of aqueous urea solution surrounds a cavity of liquid aqueous urea solution, and the at least one lamella at least partially extends through the frozen portion of the aqueous urea solution, dividing the frozen aqueous urea solution into a plurality of cells;

displacing the plurality of cells relative to one another as the portion of the aqueous urea solution freezes.

* * * * *